US011973584B2

(12) United States Patent
Chang et al.

(10) Patent No.: US 11,973,584 B2
(45) Date of Patent: Apr. 30, 2024

(54) METHOD AND APPARATUS FOR GENERATING NOISE SIGNAL

(71) Applicant: AGENCY FOR DEFENSE DEVELOPMENT, Daejeon (KR)

(72) Inventors: Jaewon Chang, Daejeon (KR); Jeong Ho Ryu, Daejeon (KR); Joo Rae Park, Daejeon (KR); Young Ju Park, Daejeon (KR); Byeong Nam Lee, Daejeon (KR)

(73) Assignee: Agency for Defense Development, Daejeon (KR)

( * ) Notice: Subject to any disclaimer, the term of this patent is extended or adjusted under 35 U.S.C. 154(b) by 306 days.

(21) Appl. No.: 17/376,591

(22) Filed: Jul. 15, 2021

(65) Prior Publication Data

US 2022/0069937 A1 Mar. 3, 2022

(30) Foreign Application Priority Data

Aug. 26, 2020 (KR) ........................ 10-2020-0107979

(51) Int. Cl.
*H04K 3/00* (2006.01)

(52) U.S. Cl.
CPC ...................................... *H04K 3/42* (2013.01)

(58) Field of Classification Search
CPC ........................................................ H04K 3/42
See application file for complete search history.

(56) References Cited

U.S. PATENT DOCUMENTS 3,699,575 A * 10/1972 Peters, Jr. ................. G01S 7/38 342/14
10,404,211 B1 9/2019 Civerolo et al.

OTHER PUBLICATIONS

Office Action in Korean Application No. 10-2020-0107979 dated May 31, 2022 in 8 pages.

* cited by examiner

*Primary Examiner* — Hsinchun Liao
(74) *Attorney, Agent, or Firm* — Knobbe, Martens, Olson & Bear, LLP

(57) ABSTRACT

This application relates to a noise signal generating apparatus. In one aspect, the apparatus includes a bandwidth expansion unit configured to generate a noise signal having a second bandwidth by expanding a noise source signal having a first bandwidth to the second bandwidth that is greater than the first bandwidth. The apparatus may also include a randomization unit configured to perform randomization and output the generated noise signal having the second bandwidth.

17 Claims, 16 Drawing Sheets

METHOD AND APPARATUS FOR GENERATING NOISE SIGNAL

CROSS-REFERENCE TO RELATED APPLICATION

This application claims priority to Korean Patent Application No. 10-2020-0107979, filed on Aug. 26, 2020. The entire contents of the application on which the priority is based are incorporated herein by reference.

TECHNICAL FIELD

The present disclosure relates to generating a noise signal, more specifically, to a noise signal generating apparatus and a noise signal generating method for generating a noise signal of various bandwidths.

BACKGROUND

Electronic Attack (EA) is generally performed by using location information of the enemy's threat signal obtained through Electronic Support (ES) to output a high-power Electronic Jamming signal or an Electronic Deception signal in a direction of the threat signal. The high-power Electronic Jamming signal used for the EA is generated by using a noise signal generated in accordance with the bandwidth of the signal to be attacked in the frequency band where the EA is required.

The noise signal for the EA can be used for an effective EA only if the noise signal has a frequency characteristic that is even within a desired bandwidth in a desired frequency band. This is because, if a specific pattern exists in the generated noise signal or the frequency characteristic is uneven, the threat receiving the EA can recognize the corresponding characteristic factors and then invalidate the EA. Therefore, as the characteristic of the noise signal generated for the EA is closer to the characteristic of Additive White Gaussian Noise (AWGN), it can be used as a signal suitable for the effective EA.

SUMMARY

An embodiment of the present disclosure provides a noise signal generating apparatus and a noise signal generating method for generating a noise signal of various bandwidths with low complexity so as to have a characteristic similar to AWGN.

The problem to be solved by the present disclosure is not limited to those described above, and another problem to be solved that is not described may be clearly understood by those skilled in the art to which the present disclosure belongs from the following description.

In accordance with an aspect of the present disclosure, there is provided a noise signal generating apparatus including, a bandwidth expansion unit configured to generate a noise signal having a second bandwidth by expanding a noise source signal having a first bandwidth to the second bandwidth that is greater than the first bandwidth, and a randomization unit configured to perform randomization and output the generated noise signal having the second bandwidth.

In accordance with an aspect of the present disclosure, there is provided a noise signal generating method performed by a noise signal generating apparatus, the method including, generating a noise signal having a second bandwidth by expanding a noise source signal having a first bandwidth to the second bandwidth that is greater than the first bandwidth, and outputting the generated noise signal having the second bandwidth by performing randomization.

According to an embodiment of the present disclosure, the noise signal of the various bandwidths may be generated with low complexity so as to have the characteristic similar to the AWGN by generating a narrowband noise signal of various bandwidths and then outputting them with randomization.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
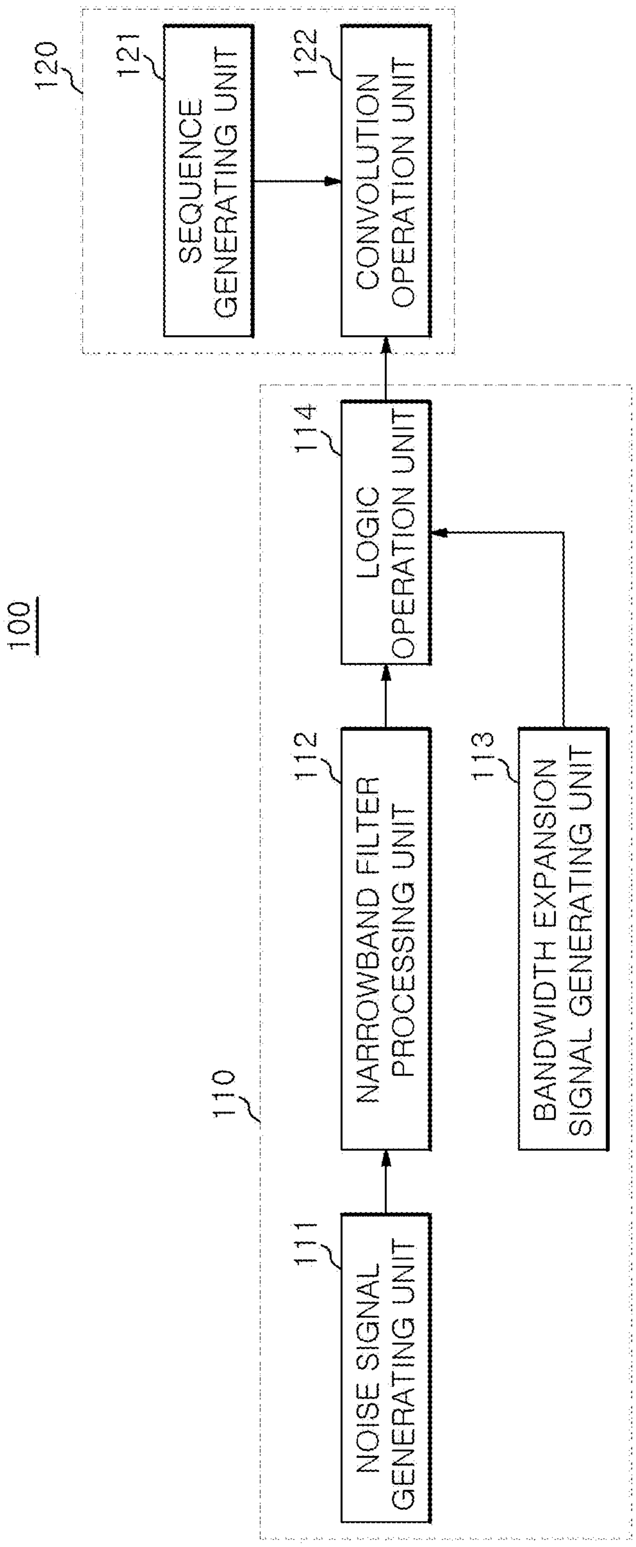
FIG. 1 shows a block diagram illustrating a configuration of a noise signal generating apparatus according to an embodiment of the present disclosure.

FIG. 1 shows a block diagram illustrating a configuration of a noise signal generating apparatus 100 according to an embodiment of the present disclosure.

Referring to FIG. 1, the noise signal generating apparatus 100 according to an embodiment includes a bandwidth expansion unit 110 and a randomization unit 120. The bandwidth expansion unit 110 may include a noise signal generating unit 111, a narrowband filter processing unit 112, a bandwidth expansion signal generating unit 113, and a logic operation unit 114. The randomization unit 120 may include a sequence generating unit 121 and a convolution operation unit 122.

The bandwidth expansion unit 110 generates a noise signal having a desired bandwidth by expanding a narrowband noise source signal to the desired bandwidth. Herein, the narrowband noise source signal indicates a noise source signal having a first bandwidth, and the desired bandwidth indicates a second bandwidth greater than the first bandwidth.

Accordingly, the noise signal having the desired bandwidth indicates the noise signal having the second bandwidth.

The noise signal generating unit 111 of the bandwidth expansion unit 110 may generate a noise source signal, and the narrowband filter processing unit 112 of the bandwidth expansion unit 110 may generate the narrowband noise source signal by passing the noise source signal through one or more narrowband filters among a plurality of narrowband filters.

The bandwidth expansion signal generating unit 113 of the bandwidth expansion unit 110 may generate a bandwidth expansion signal, and the logic operation unit 114 of the bandwidth expansion unit 110 may generate the noise signal having the desired bandwidth through a logical conjunction operation on the narrowband noise source signal and the bandwidth expansion signal. Herein, the bandwidth expansion signal generating unit 113 may generate the bandwidth expansion signal by using a product of a plurality of cosine functions, and may generate the bandwidth expansion signal based on the bandwidth of the narrowband noise source signal. In addition, the bandwidth expansion signal generating unit 113 may generate the bandwidth expansion signal by expanding the bandwidth of the narrowband noise source signal by $2^K$ times by using K number of cosine functions. For example, the bandwidth expansion signal generating unit 113 may generate the bandwidth expansion signal by using a bandwidth expansion level index $i_k$ that determines a bandwidth expansion level through activation/inactivation of K number of cosine functions.

The randomization unit 120 outputs, by performing randomization, the noise signal having the desired bandwidth generated by the bandwidth expansion unit 110. The randomization unit 120 may perform the randomization through a convolution operation on the noise signal having the desired bandwidth and a Pseudo Random Sequence. Alternatively, the randomization unit 120 may perform the randomization through a convolution operation on the noise signal having the desired bandwidth and a Constant Amplitude Zero Auto-Correlation (CAZAC) Sequence.

Figure 2:
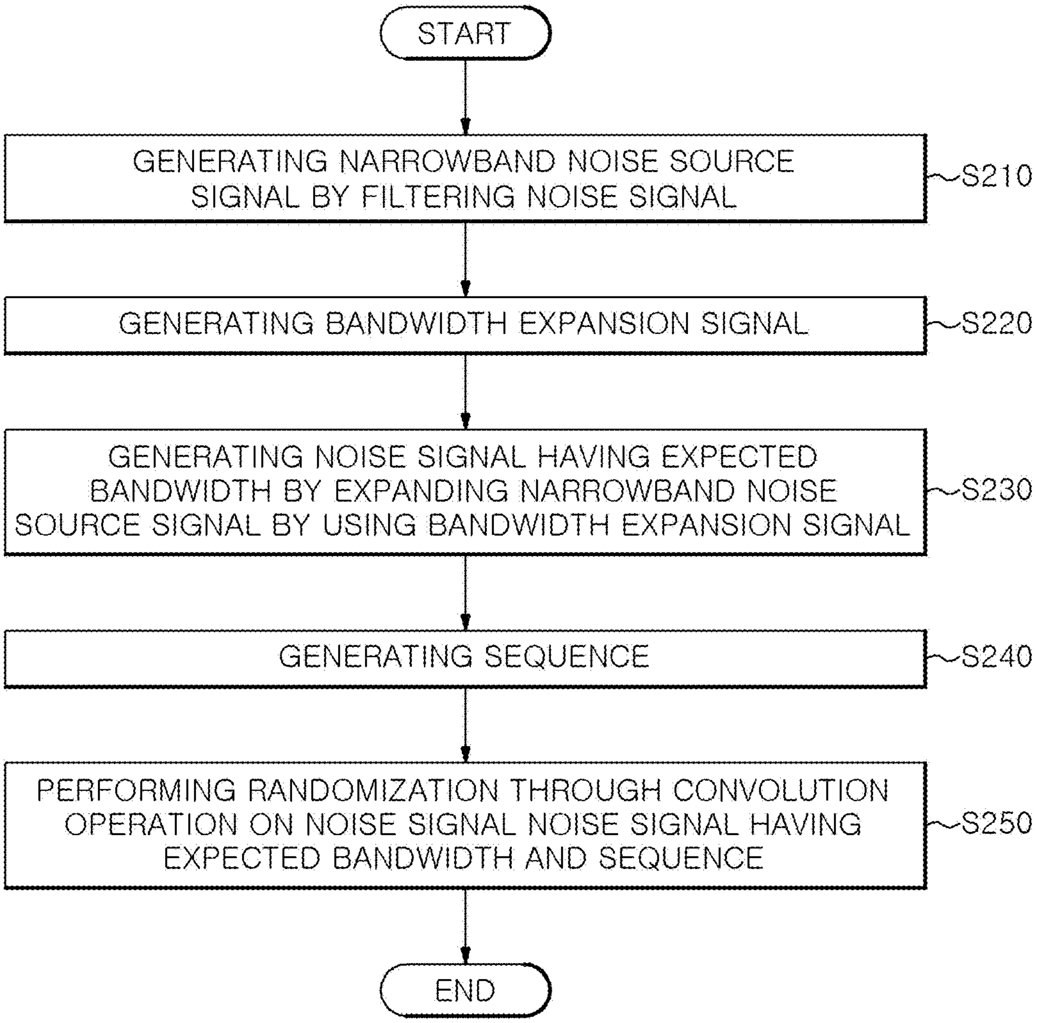
FIG. 2 shows a flowchart illustrating a noise signal generating method performed by a noise signal generating apparatus according to an embodiment of the present disclosure.

FIG. 2 shows a flowchart illustrating a noise signal generating method performed by the noise signal generating apparatus 100 according to an embodiment of the present disclosure.

Referring to FIG. 2, the noise signal generating method according to an embodiment includes a step S210 of generating a narrowband noise source signal by filtering a noise source signal through at least one narrowband filter among a plurality of narrowband filters.

In addition, the noise signal generating method according to an embodiment further includes a step S220 of generating a bandwidth expansion signal.

In addition, the noise signal generating method according to an embodiment further includes a step S230 of generating a noise signal having a desired bandwidth by expanding the narrowband noise source signal by using a bandwidth expansion signal.

In addition, the noise signal generating method according to an embodiment further includes a step S240 of generating a Pseudo Random Sequence or a Constant Amplitude Zero Auto-Correlation (CAZAC) Sequence to be used for the randomization.

In addition, the noise signal generating method according to an embodiment further includes a step S250 of randomizing the noise signal having the desired bandwidth through a convolution operation on sequences.

Hereinafter, the noise signal generating method performed by the noise signal generating apparatus 100 according to an embodiment will be described in detail with reference to FIGS. 1 to 7.

First, the noise signal generating unit 111 of the noise signal generating apparatus 100 generates an In-Phase signal and a Quadrature signal with a Gaussian distribution, respectively, and then adds the two signals together to generate a random noise signal with a Complex Gaussian distribution.

The random noise signal generated by the noise signal generating unit 111 with the Complex Gaussian distribution may be defined as a noise source signal as follows.

[Equation 1]

$$s(n) = x(n) + jy(n),$$

$$s \sim \mathcal{N}(\mu_1, \mu_2, \sigma_1^2\sigma_2^2) \rightarrow f_{xy}(x, y) = \frac{1}{2\pi\sigma_1\sigma_2}\exp\left[-\left(\frac{(x-\mu_1)^2}{\sigma_1^2} + \frac{(y-\mu_2)^2}{\sigma_2^2}\right]\right.$$

Herein, assuming the random noise source signal generated with the Complex Gaussian distribution is referred to as s(n), s(n) may be expressed as a sum of x(n) which is a real value of the random noise source signal and y(n) which is an imaginary value of the random noise source signal. In addition, x(n) and y(n) follow the Complex Gaussian distribution $f_{xy}(x,y)$ of Equation 1 in which averages are $\mu_1$ and $\mu_2$, and variances are $\sigma_1^2$ and $\sigma_2^2$, respectively.

As described above, since the random noise source signal generated by the noise signal generating unit 111 has a signal characteristic having an infinite bandwidth component in a frequency axis as shown in FIG. 3(*a*), the random noise source signal may be converted to a band-limited narrowband noise source signal $\bar{s}(n)$ that may be implemented in an actual system.

To this end, in the step S210, the narrowband filter processing unit 112 generates the narrowband noise source signal by passing the noise source signal through one or more narrowband filters among a plurality of narrowband filters. For example, if a Low-pass filter with a passband frequency of 9 MHz, a stopband frequency of 10 MHz, a passband ripple of 0.5 dB, and a stopband attenuation of 40 dB is applied in order to generate the narrowband noise source signal $\bar{s}(n)$ with a bandwidth B of 20 MHz, a result thereof is as shown in FIG. 3(*b*).

Herein, the narrowband filter processing unit 112 may use a plurality of digital filters each having a different bandwidth to implement various noise signal bandwidth resolutions. When switching the digital filters having a plurality of different bandwidths such as a bandwidth $B_1$ of 1 MHz, a bandwidth $B_2$ of 20 MHz, a bandwidth $B_3$ of 500 MHz, etc., thereby filtering the noise source signal through any one of the digital filters, it is possible to expand and generate a noise signal having more various bandwidth resolutions.

In a step S220, the bandwidth expansion signal generating unit 113 generates a bandwidth expansion signal as shown in Equation 2. In the step S230, the generated bandwidth expansion signal is provided for the logic operation unit 114 with the narrowband noise source signal $\bar{s}(n)$ output from the narrowband digital processing unit 112, and converted to a noise signal having a desired bandwidth through a logical conjunction operation by the logic operation unit 114. The converted signal is the same as a frequency spectrum result of FIG. 3C.

Figure 3A:
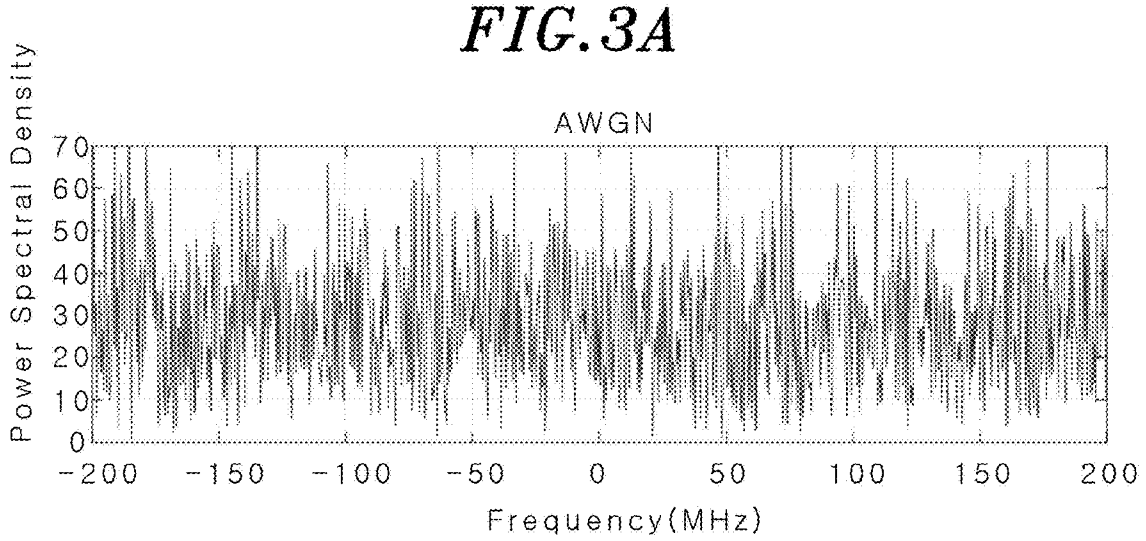
FIGS. 3A, 3B and 3C show graphs of a power spectrum density function of a random noise signal generated with a Complex Gaussian distribution, a narrowband noise source signal generated by applying a narrowband digital filter, and a noise signal generated with an expanded bandwidth.
Figure 3B:
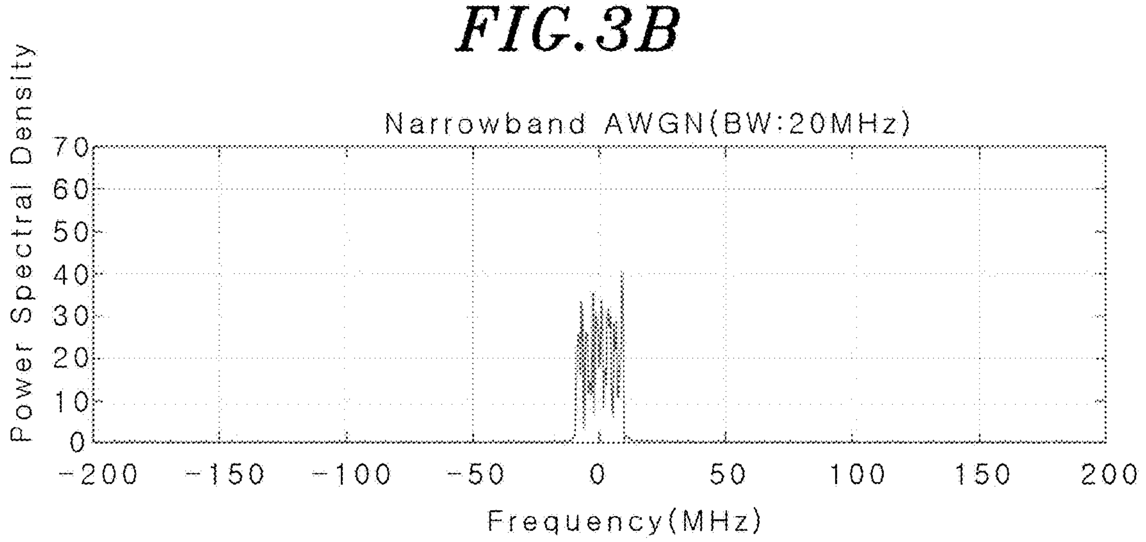
Figure 3C:
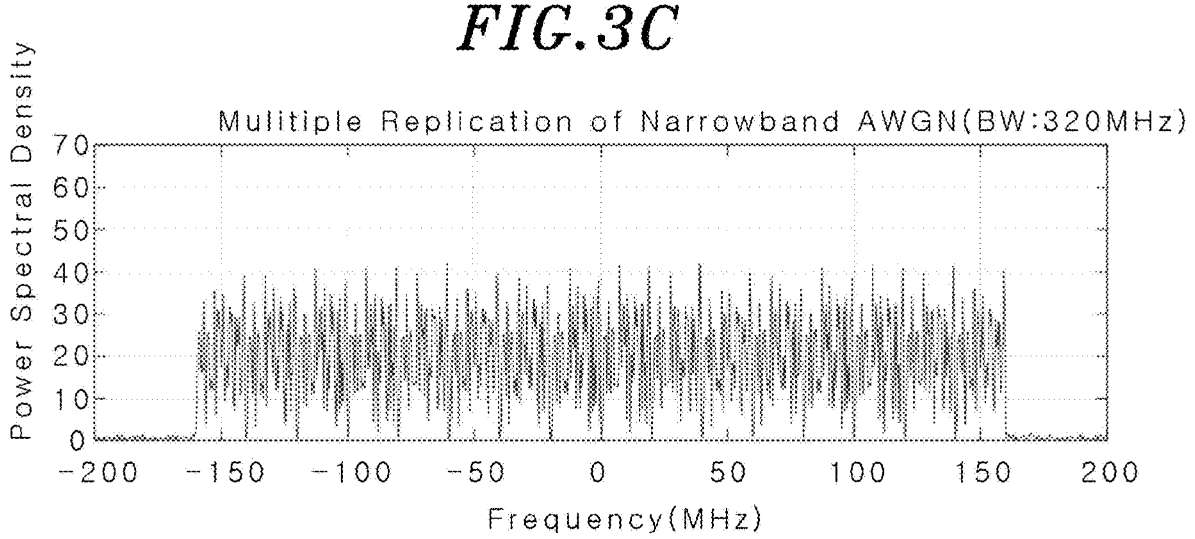

FIGS. 3A, 3B and 3C show graphs of a power spectrum density function of a random noise signal generated with a Complex Gaussian distribution, a narrowband noise source signal generated by applying a narrowband digital filter, and a noise signal generated with an expanded bandwidth.

[Equation 2]

$$\hat{s}(n) = \bar{s}(n)\times\cos\left[2\pi\left(\frac{2^{-1}B}{f_s}i_1\right)n\right]\times\cos\left[2\pi\left(\frac{2^{0}B}{f_s}i_2\right)n\right]\times\ldots\times\cos\left[2\pi\left(\frac{2^{K-2}B}{f_s}i_K\right)n\right]$$

The noise signal $\hat{s}(n)$ having the expanded bandwidth includes the narrowband noise source signal $\bar{s}(n)$ and the bandwidth expansion signals, and the frequencies of the bandwidth expansion signals are determined by a bandwidth B of the narrowband noise source signal $\bar{s}(n)$. $f_s$ indicates a sampling frequency, and $i_k$ indicates a bandwidth expansion level index that determines the bandwidth expansion level. Herein, $i_k$=0 or 1. In Equation 2, the expansion bandwidth is changed based on a value of the bandwidth expansion level index, and an embodiment of a bandwidth that may be expanded for a given bandwidth B is as follows.

TABLE 1

| Bandwidth (MHz) | bandwidth expansion level index $i_k$: $i_1$ | $i_2$ | $i_3$ | $i_4$ | $i_5$ | . . . | $i_K$ | Expansion Bandwidth (MHz) |
|---|---|---|---|---|---|---|---|---|
| 1 | 1 | 0 | 0 | 0 | 0 | . . . | 0 | 2 |
| | 1 | 1 | 0 | 0 | 0 | . . . | 0 | 4 |
| | 1 | 1 | 1 | 0 | 0 | . . . | 0 | 8 |
| | 1 | 1 | 1 | 1 | 0 | . . . | 0 | 16 |
| | 1 | 1 | 1 | 1 | 1 | . . . | 0 | 32 |
| 20 | 1 | 0 | 0 | 0 | 0 | . . . | 0 | 40 |
| | 1 | 1 | 0 | 0 | 0 | . . . | 0 | 80 |
| | 1 | 1 | 1 | 0 | 0 | . . . | 0 | 160 |
| | 1 | 1 | 1 | 1 | 0 | . . . | 0 | 320 |
| | 1 | 1 | 1 | 1 | 1 | . . . | 0 | 640 |
| 500 | 1 | 0 | 0 | 0 | 0 | . . . | 0 | 1000 |
| | 1 | 1 | 0 | 0 | 0 | . . . | 0 | 2000 |
| | 1 | 1 | 1 | 0 | 0 | . . . | 0 | 4000 |
| | 1 | 1 | 1 | 1 | 0 | . . . | 0 | 8000 |
| | 1 | 1 | 1 | 1 | 1 | . . . | 0 | 16000 |
| B | 1 | 1 | 1 | 1 | 1 | . . . | 1 | $2^K \times$ B |

The bandwidth expansion signal generating unit 113 may generate the bandwidth expansion signal by using a product of a plurality of cosine functions, or may generate the bandwidth expansion signal based on a bandwidth of the narrowband noise source signal. In addition, the bandwidth expansion signal generating unit 113 may generate the bandwidth expansion signal by expanding the bandwidth of the narrowband noise source signal by $2^K$ times by using K number of cosine functions. For example, the bandwidth expansion signal generating unit 113 may generate the bandwidth expansion signal by using the bandwidth expansion level index $i_k$ that determines the bandwidth expansion level through activation/inactivation of the K number of cosine functions. In this way, if the bandwidth expansion signal generating unit 113 expands the bandwidth of the noise signal, it is formed that a frequency spectrum with the same pattern as the narrowband noise source signal is sequentially arranged as shown in the frequency spectrum of FIG. 3C. Accordingly, as shown in a result of analyzing a Probability Density Function of FIGS. 4A, 4B, 4C and 4D, a real/imaginary value of the expanded noise signal has a distorted existing Gaussian characteristic.

Figure 4A:
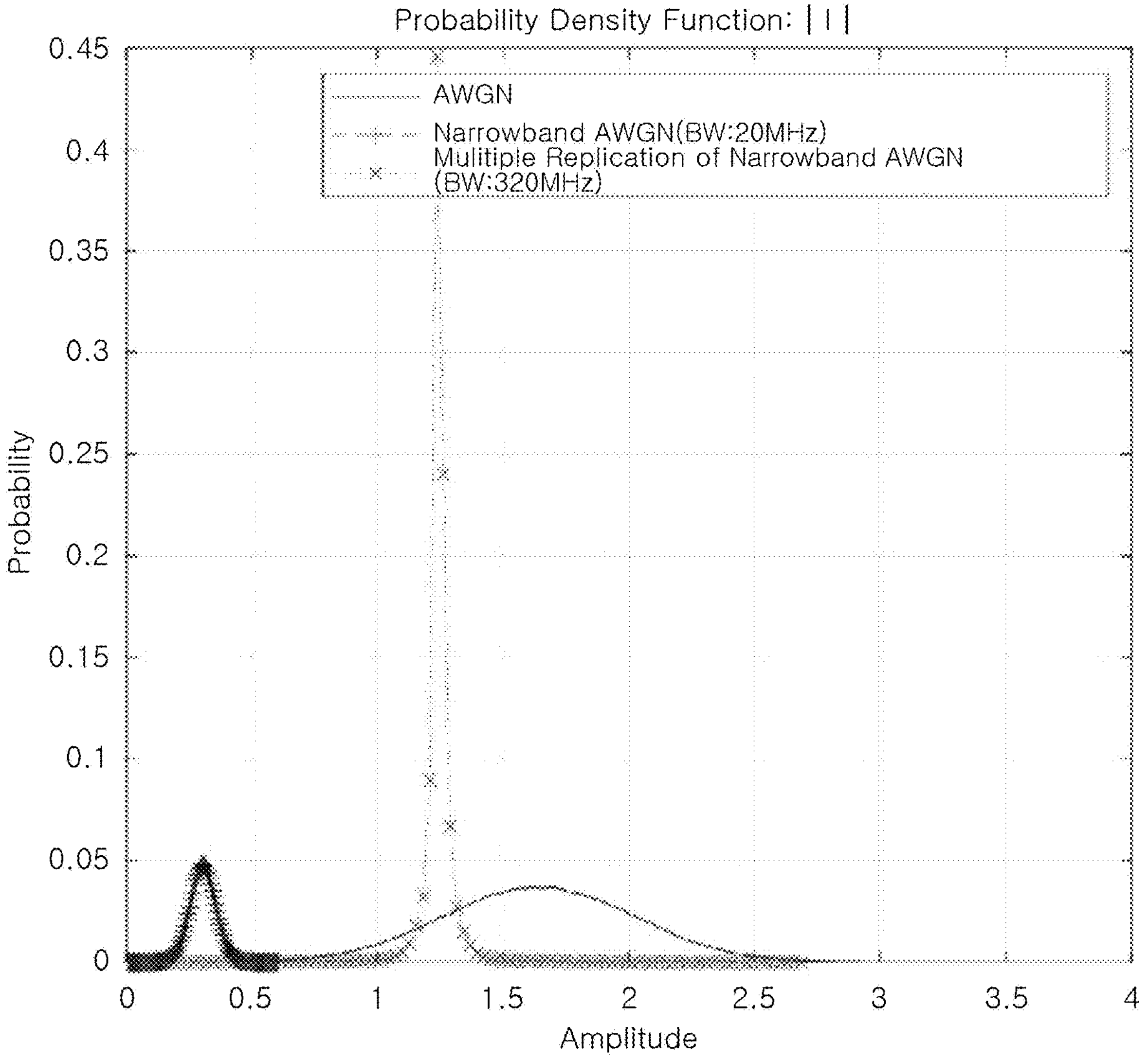
FIGS. 4A, 4B, 4C and 4D show graphs of a Probability Density Function of In-Phase signal strength $|I|$, Quadrature signal strength $|Q|$, complex signal strength $|I|+|Q|$ which is a sum of an In-Phase component and a Quadrature component, and complex signal power strength $|I|^2+|Q|^2$ of a random noise signal generated with a Complex Gaussian distribution, a narrowband noise source signal generated by applying a narrowband digital filter, and a noise signal generated with an expanded bandwidth.

FIG. 4A shows graphs of a Probability Density Function of In-Phase signal strength |I| of a random noise signal generated with a Complex Gaussian distribution, a narrowband noise source signal generated by applying a narrowband digital filter, and a noise signal generated with an expanded bandwidth.

Figure 4B:
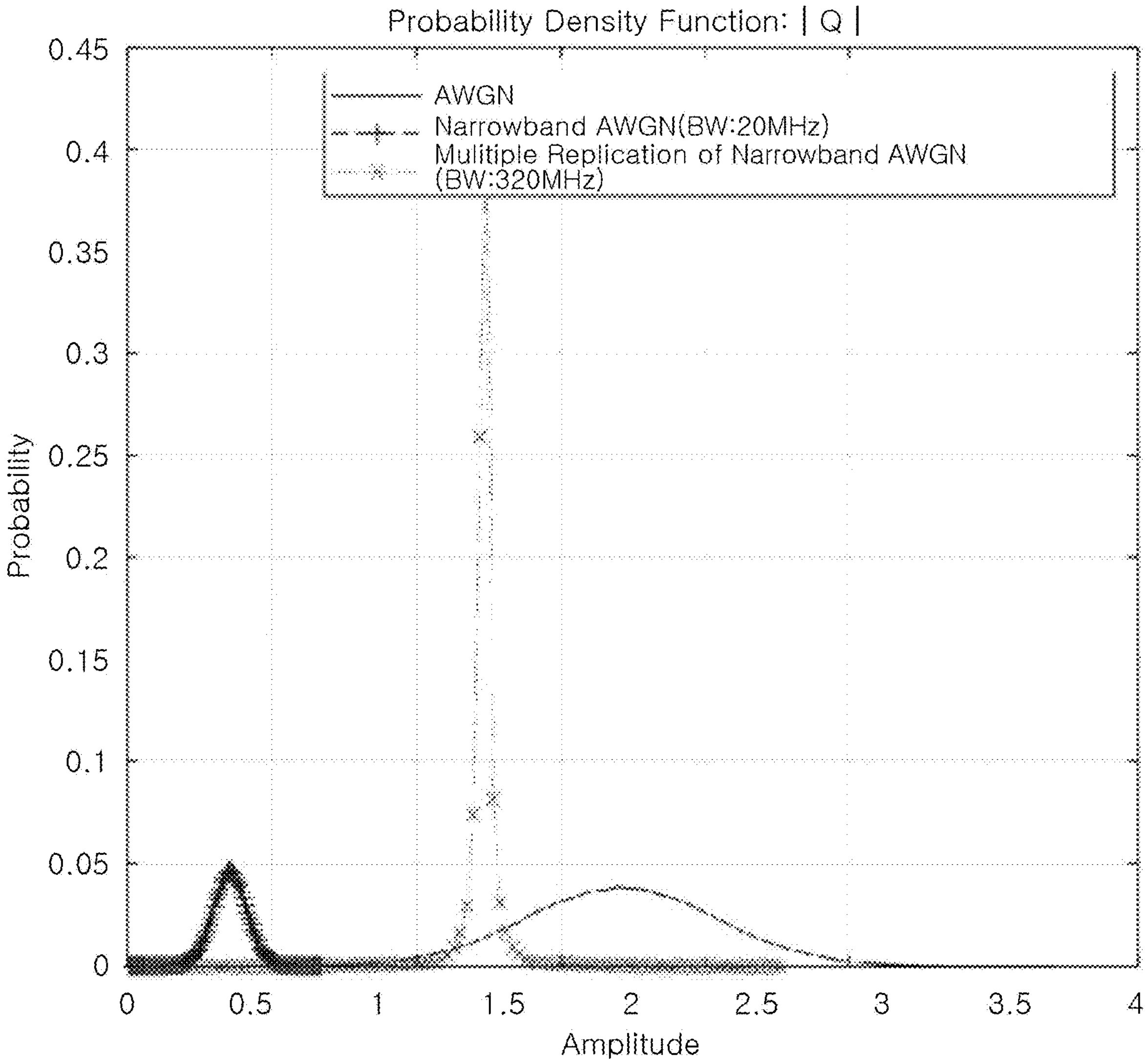

FIG. 4B shows graphs of a Probability Density Function of Quadrature signal strength |Q| of a random noise signal generated with a Complex Gaussian distribution, a narrowband noise source signal generated by applying a narrowband digital filter, and a noise signal generated with an expanded bandwidth.

Figure 4C:
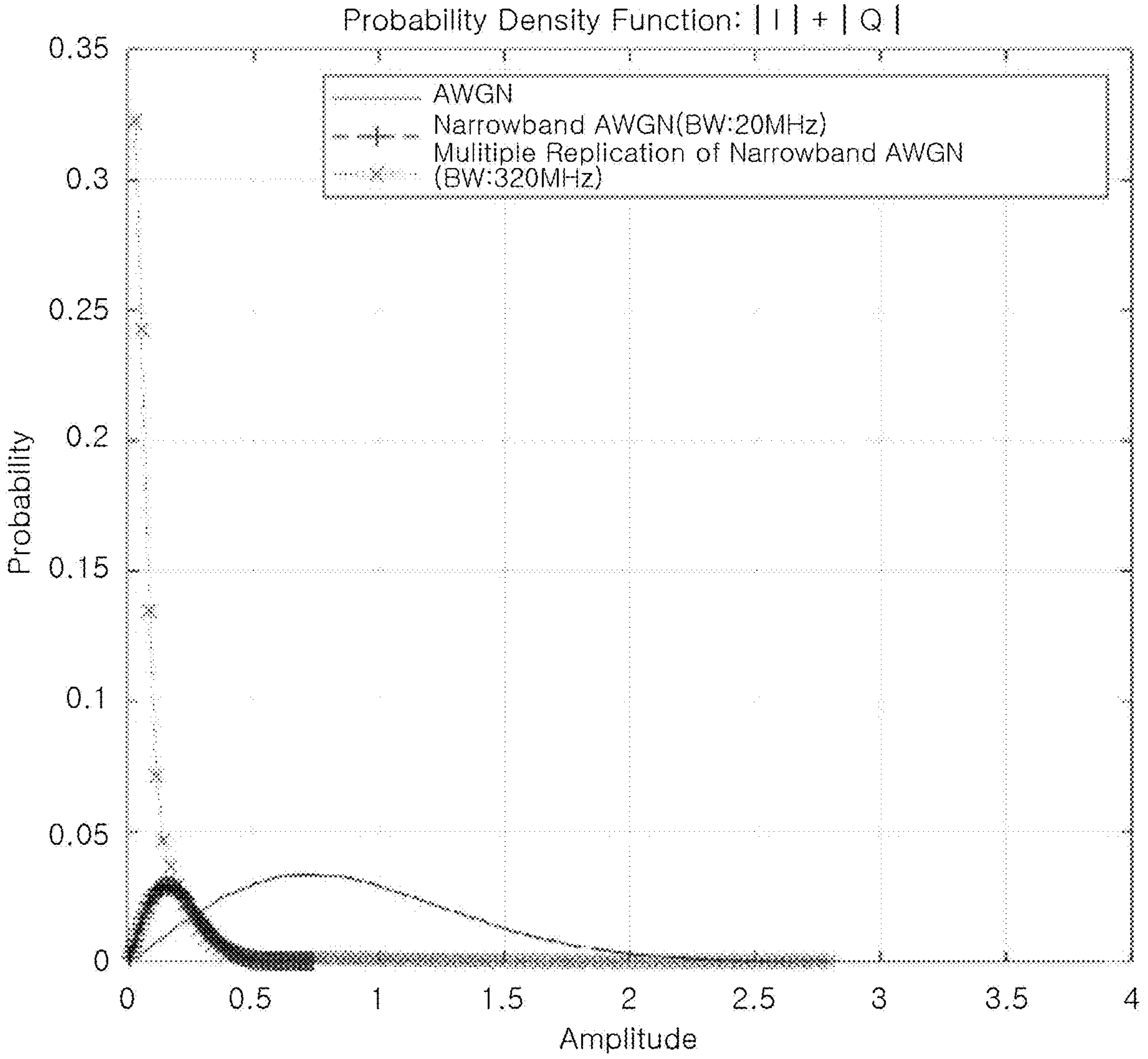

FIG. 4C shows graphs of a Probability Density Function of complex signal strength |I|+|Q|, which is a sum of an In-Phase component and a Quadrature component, of a random noise signal generated with a Complex Gaussian distribution, a narrowband noise source signal generated by applying a narrowband digital filter, and a noise signal generated with an expanded bandwidth.

Figure 4D:
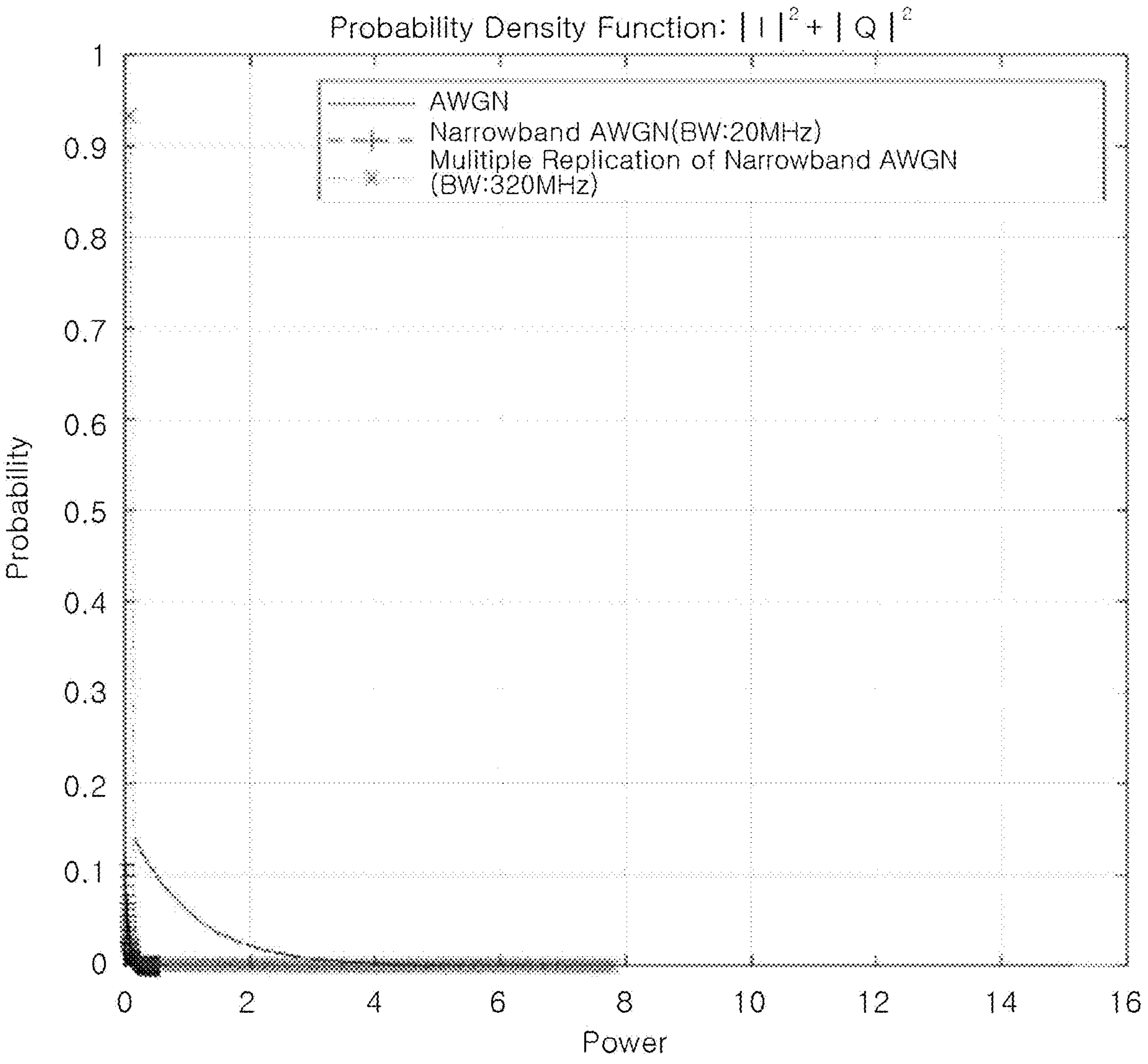

FIG. 4D shows graphs of Probability Density Function of complex signal power strength $|I|^2+|Q|^2$ of a random noise signal generated with a Complex Gaussian distribution, a narrowband noise source signal generated by applying a narrowband digital filter, and a noise signal generated with an expanded bandwidth.

In order to minimize distortion that occurs when a specific pattern exists in the noise signal generated in the step S230 or when the frequency characteristic is uneven, and in order to have a characteristic similar to an existing Additive White Gaussian Noise (AWGN), randomization may be applied to the noise signal ŝ(n) having the expanded bandwidth.

The sequence generating unit 121 generates a Pseudo Random Sequence or a Constant Amplitude Zero Auto-Correlation (CAZAC) Sequence to be used for the randomization. For example, there is a Pseudo Noise Sequence that is a Pseudo Random Sequence, and since a value normalized to −1 or 1 is used for the randomization in a case of the Pseudo Noise Sequence, there is a limit to a randomization characteristic in terms of a phase and a frequency. The CAZAC Sequence as shown in Equation 3 may be used as a signal sequence used to compensate for the limitation.

[Equation 3]

$$c(n) = \begin{cases} \exp\left[-j\pi k\frac{n^2}{N}\right] & N \text{ is even} \\ \exp\left[-j\pi k\frac{n(n+1)}{N}\right] & N \text{ is odd} \end{cases}$$

Herein, a size of N is the number of samples included in a sequence block, and c(n) indicates an n-th output value if N is an arbitrary positive number. k is an index that determines a type of a sequence, and if the size of N is fixed, a plurality of CAZAC Sequences may be generated by changing k into an integer value between 1 and N−1.

Figure 5A:
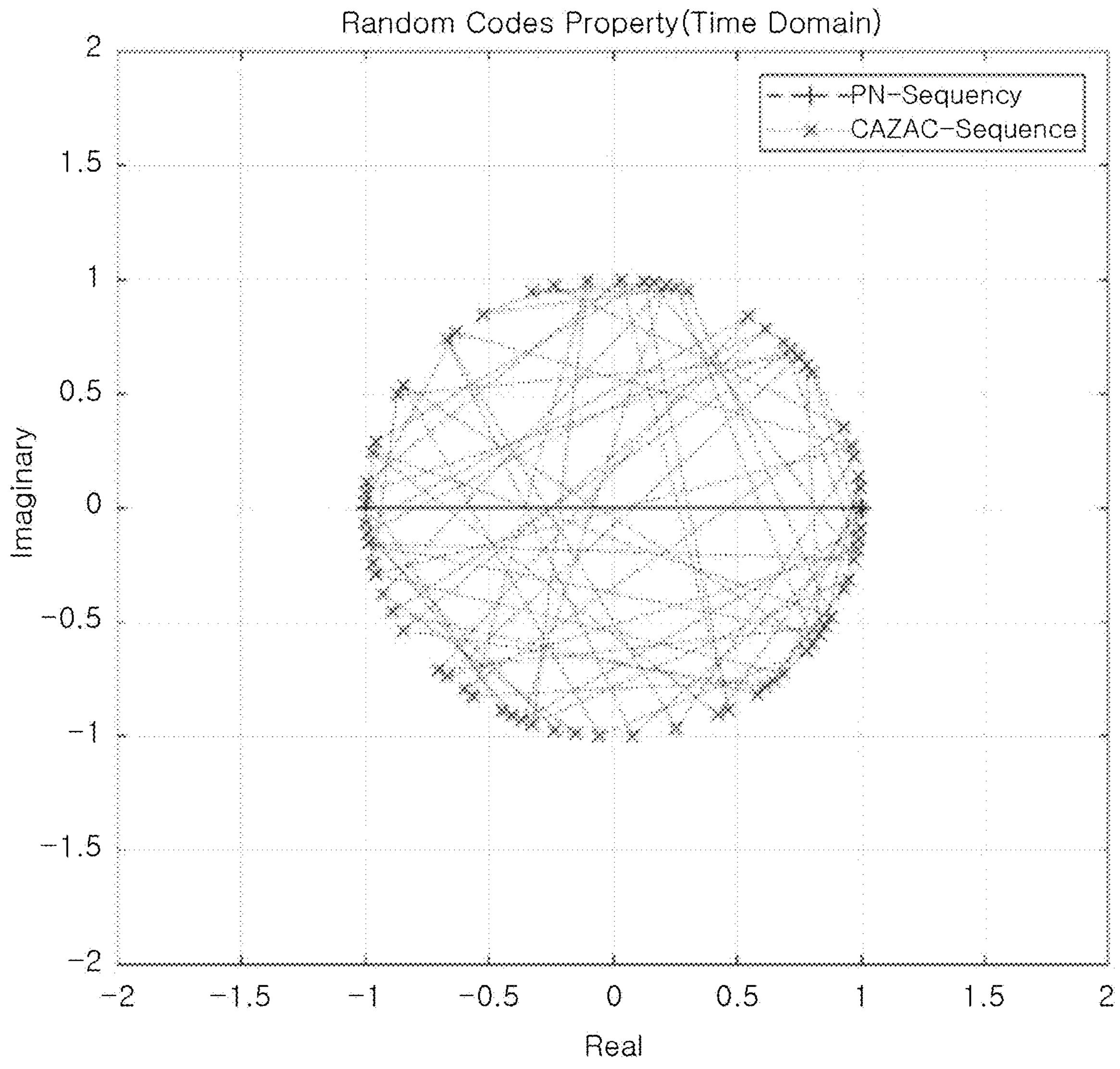
FIGS. 5A, 5B, 5C and 5D show an In-Phase/Quadrature characteristic on a complex plane on a time axis, an Auto-correlation characteristic on the time axis, an In-Phase/Quadrature characteristic on the complex plane on a frequency axis, and an Auto-correlation characteristic on the frequency axis of a Pseudo Noise Sequence, which is a Pseudo Random Sequence, and a Constant Amplitude Zero Auto-Correlation (CAZAC) Sequence.
Figure 5B:
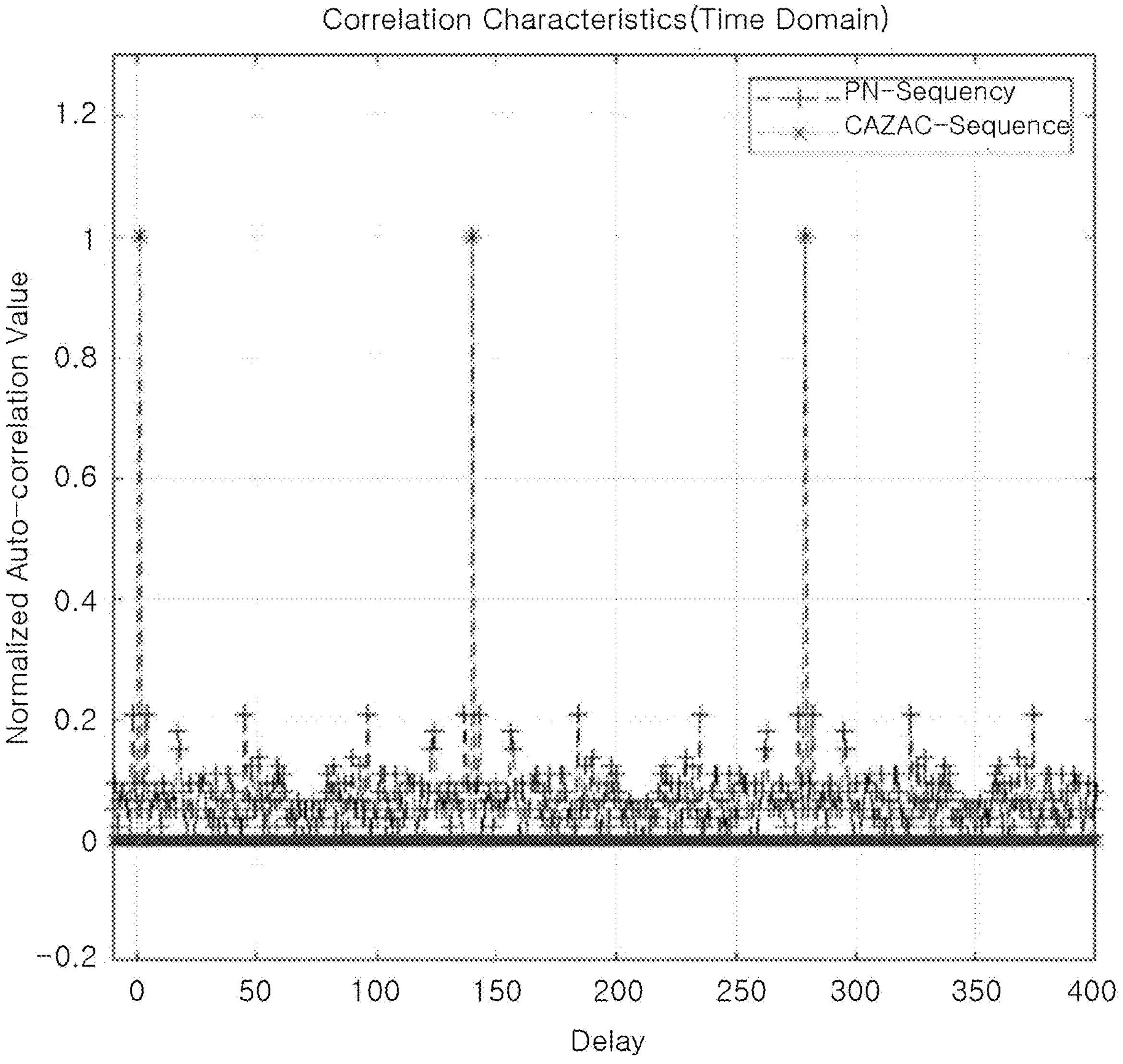
Figure 5C:
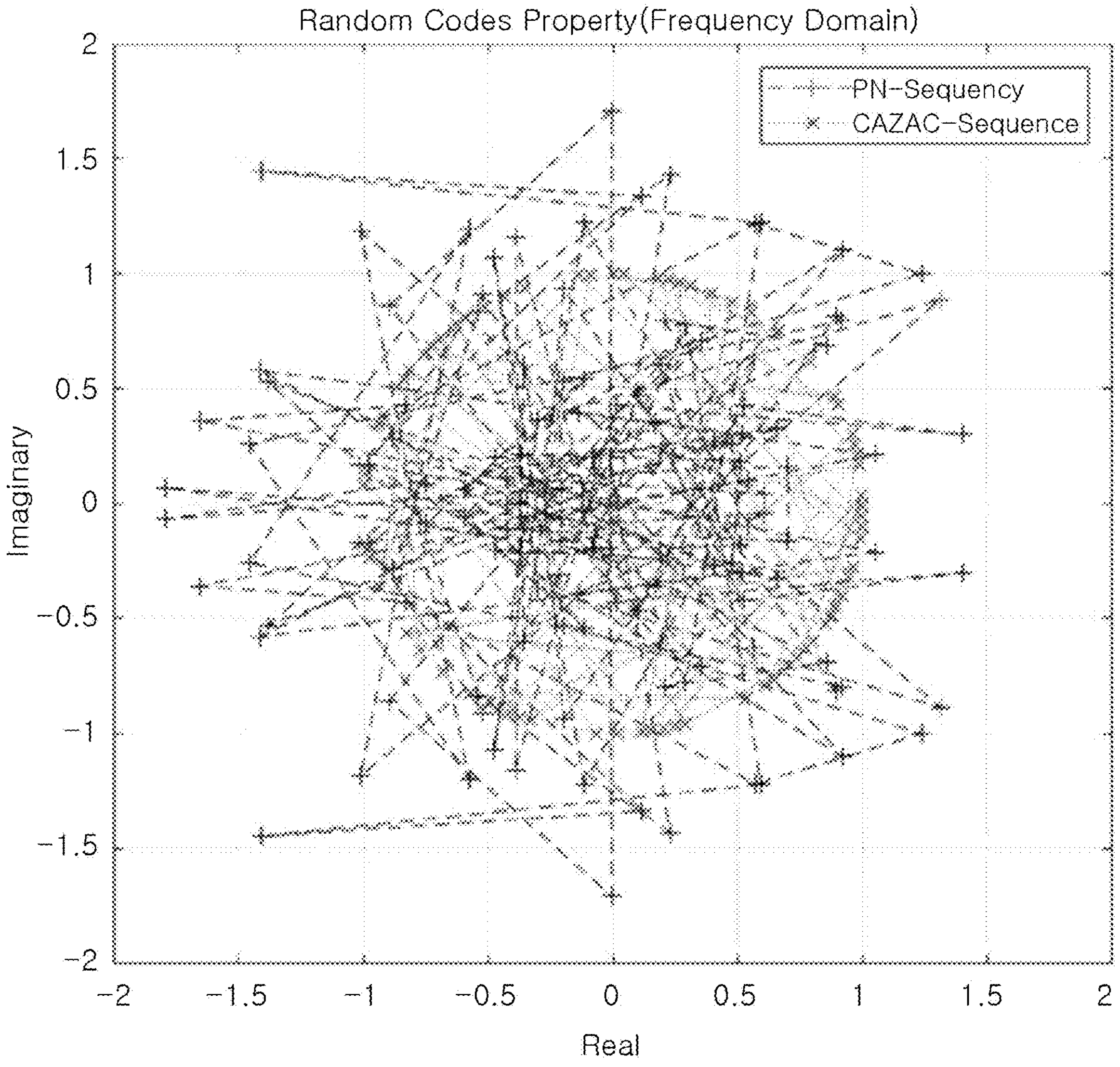
Figure 5D:
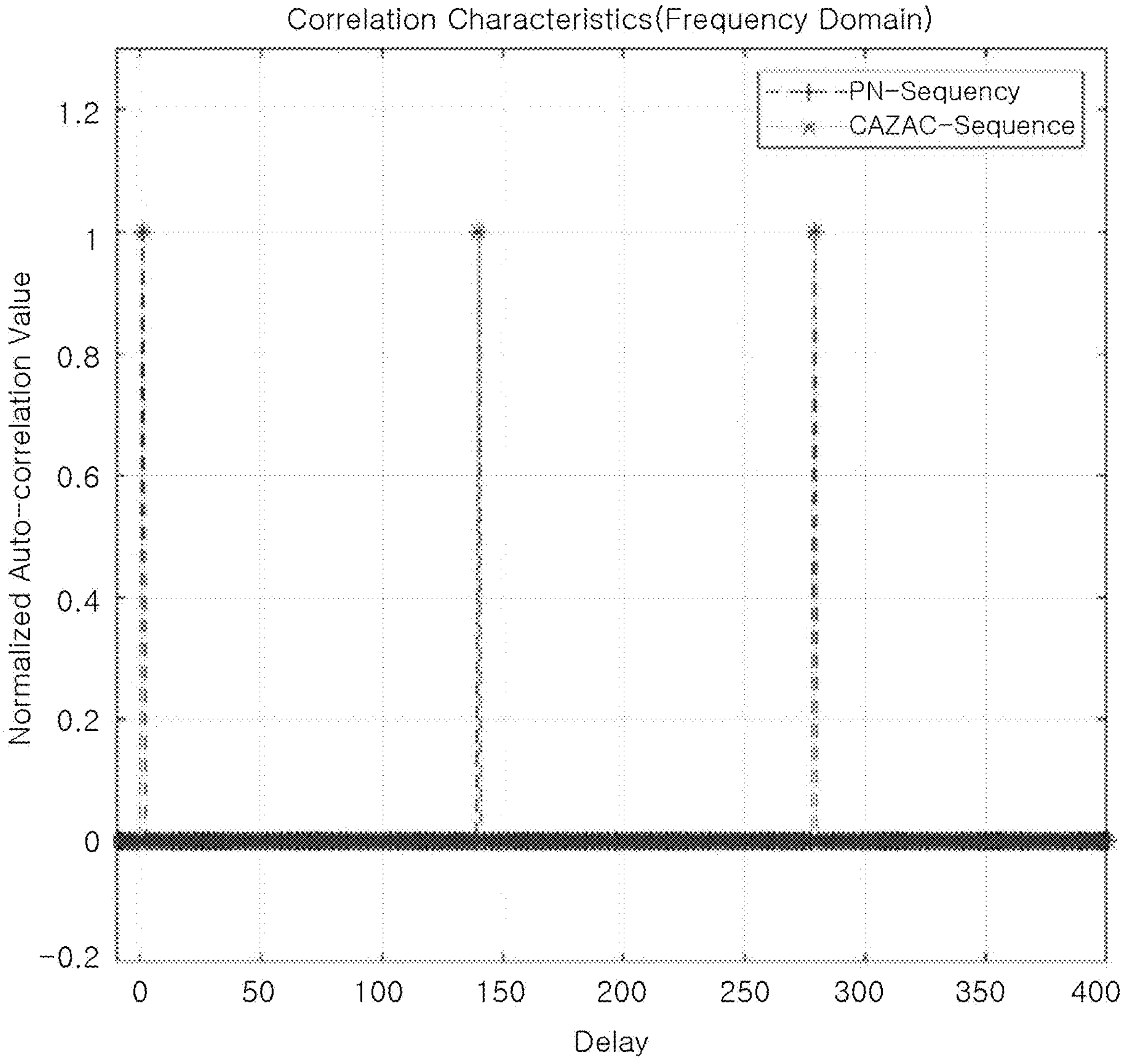

FIGS. 5A, 5B, 5C and 5D show a result of comparing a complex plane characteristic and an Auto-correlation characteristic of a Pseudo Noise Sequence and a CAZAC Sequence observed on a time/frequency axis. FIG. 5A shows an In-Phase/Quadrature characteristic on a complex plane on a time axis of a Pseudo Noise Sequence, which is a Pseudo Random Sequence, and a CAZAC Sequence. FIG. 5B shows an Auto-correlation characteristic on a time axis of a Pseudo Noise Sequence, which is a Pseudo Random Sequence, and a CAZAC Sequence. FIG. 5C shows an In-Phase/Quadrature characteristic on a complex plane on a frequency axis of a Pseudo Noise Sequence, which is a Pseudo Random Sequence, and a CAZAC Sequence. FIG. 5D shows an Auto-correlation characteristic on a frequency axis of a Pseudo Noise Sequence, which is a Pseudo Random sequence, and a CAZAC Sequence.

Compared with the Pseudo Noise Sequence, the CAZAC Sequence has a randomized sequence while maintaining a constant signal strength (radius) on the complex plane on the time/frequency axis, and it may be identified that the CAZAC Sequence has an excellent characteristic in terms of the Auto-correlation on the time/frequency axis. Such a characteristic may be effectively utilized to minimize a specific pattern existing on a noise signal ŝ(n) having an expanded bandwidth and to have a frequency characteristic similar to that of the existing AWGN.

Randomization for the noise signal ŝ(n) having the bandwidth expanded in the step S230 may be performed by applying a convolution operation using the Pseudo Random Sequence c(n) generated by the sequence generating unit 121 as shown in Equation 4. In order to continuously apply a length N of the Pseudo Random Sequence to a noise signal sequence of the expanded bandwidth, a circular convolution operation using the Pseudo Random Sequence c(n) is applied.

[Equation 4]

$$y(n) = \hat{s}(n) * c(n) = \sum_{\tau=0}^{N-1} \hat{s}(\tau)c(n-\tau)$$

Figure 6A:
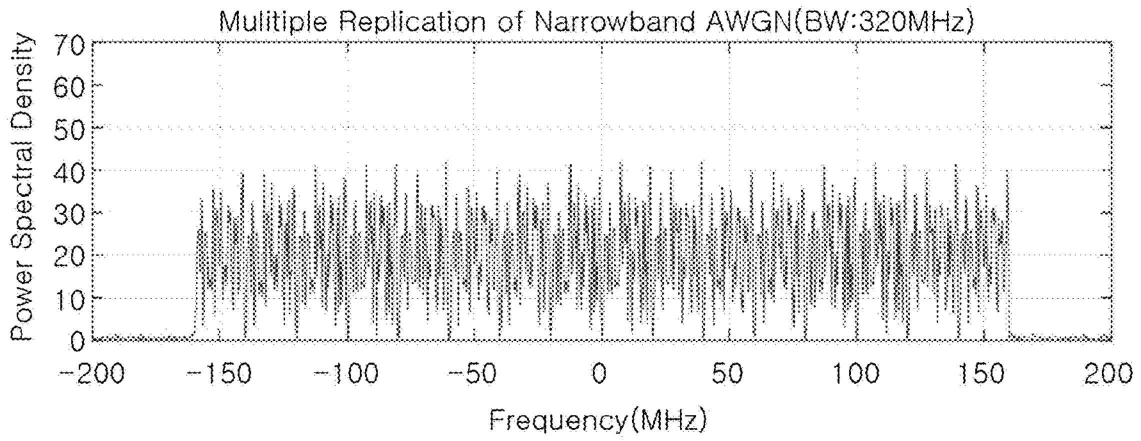
FIGS. 6A, 6B and 6C show graphs of a power spectrum density function of a noise signal generated with an expanded bandwidth, an expanded noise signal to which a Pseudo Noise Sequence is applied, and an expanded noise signal to which a CAZAC Sequence is applied.
Figure 6B:
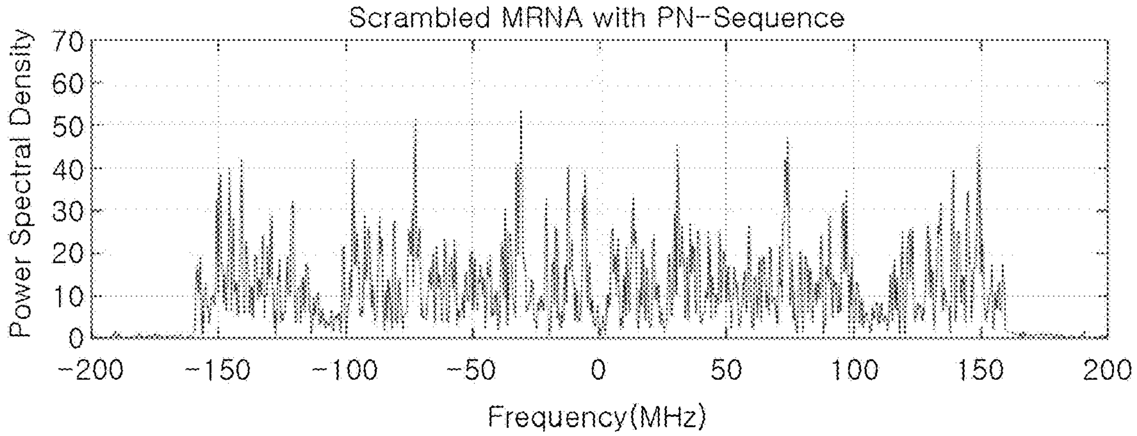
Figure 6C:
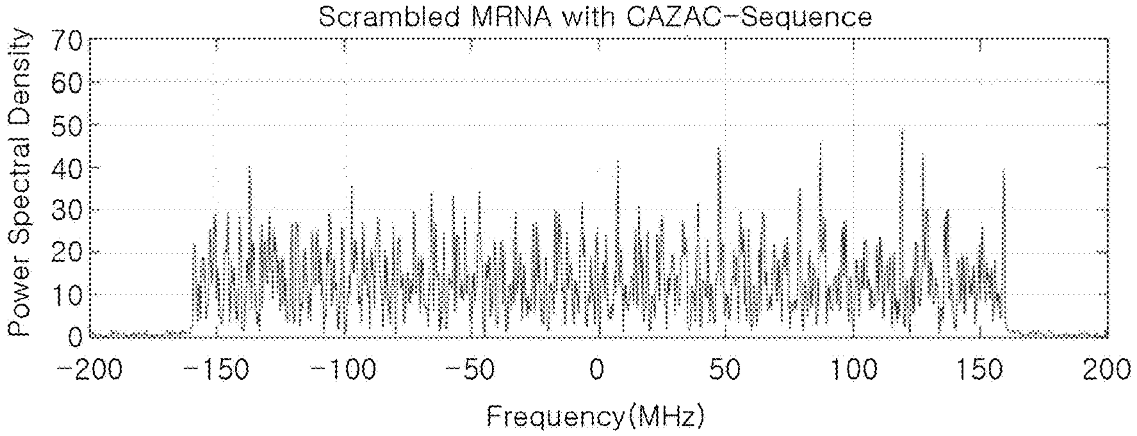

The convolution operation unit 122 receives the noise signal ŝ(n) having the expanded bandwidth and the Pseudo Random Sequence c(n), thereby outputting a randomized noise signal y(n). It may be identified that a frequency spectrum characteristic of the finally generated noise signal is as shown in FIGS. 6A, 6B and 6C. Compared to FIG. 6A showing a frequency spectrum of the noise signal ŝ(n) having the expanded bandwidth, in the case of FIG. 6B in which the Pseudo Noise Sequence is applied to the randomization and FIG. 6C in which the CAZAC Sequence is applied to the randomization, it may be seen that an existing repetitive frequency characteristic is removed and they have a frequency characteristic similar to that of AWGN. In addition, it may be seen that the frequency spectrum characteristic of the noise signal in which the CAZAC Sequence is applied to the randomization compared to the noise signal in which the Pseudo Noise Sequence is applied to the randomization has an effect of mitigating a peak level of a frequency with high signal strength.

Figure 7A:
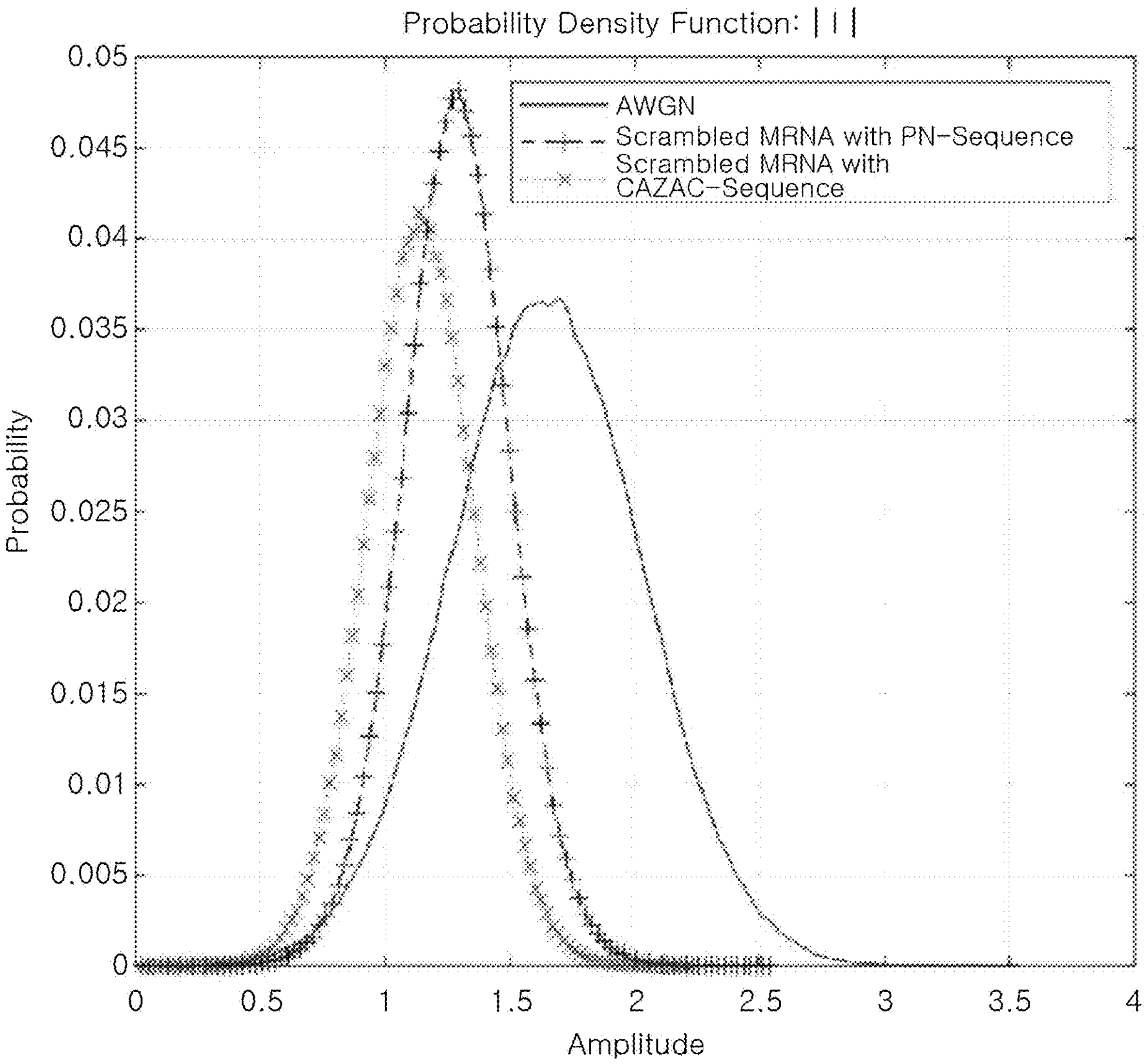
FIGS. 7A, 7B, 7C and 7D show graphs of a Probability Density Function of In-Phase signal strength III, Quadrature signal strength $|Q|$, complex signal strength $|I|+|Q|$ which is a sum of an In-Phase component and a Quadrature component, and complex signal power strength $|I|^2+|Q|^2$ of a random noise signal generated with a Complex Gaussian distribution, an expanded noise signal to which a Pseudo Noise Sequence is applied, and an expanded noise signal to which a CAZAC Sequence is applied.
Figure 7B:
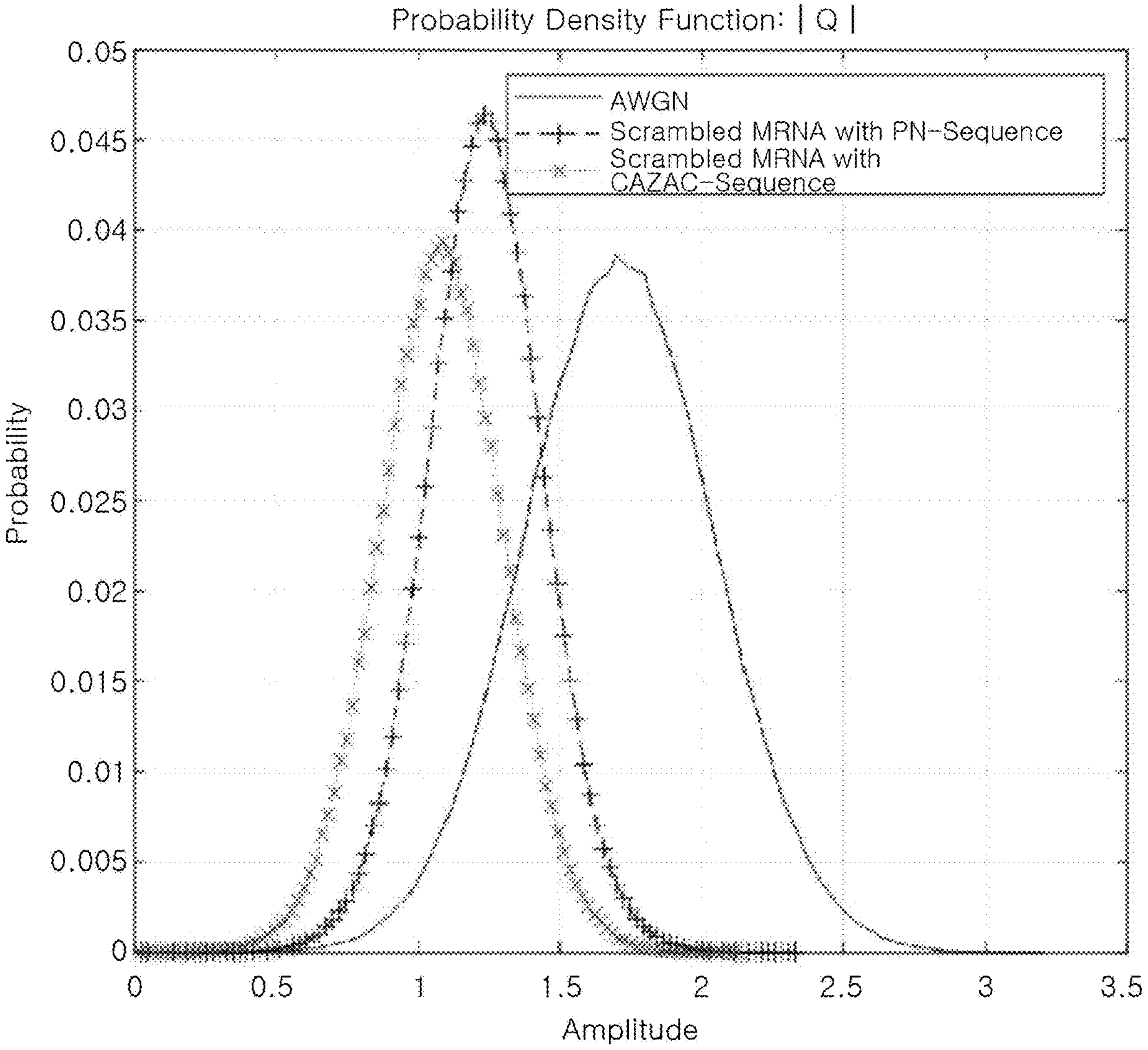
Figure 7C:
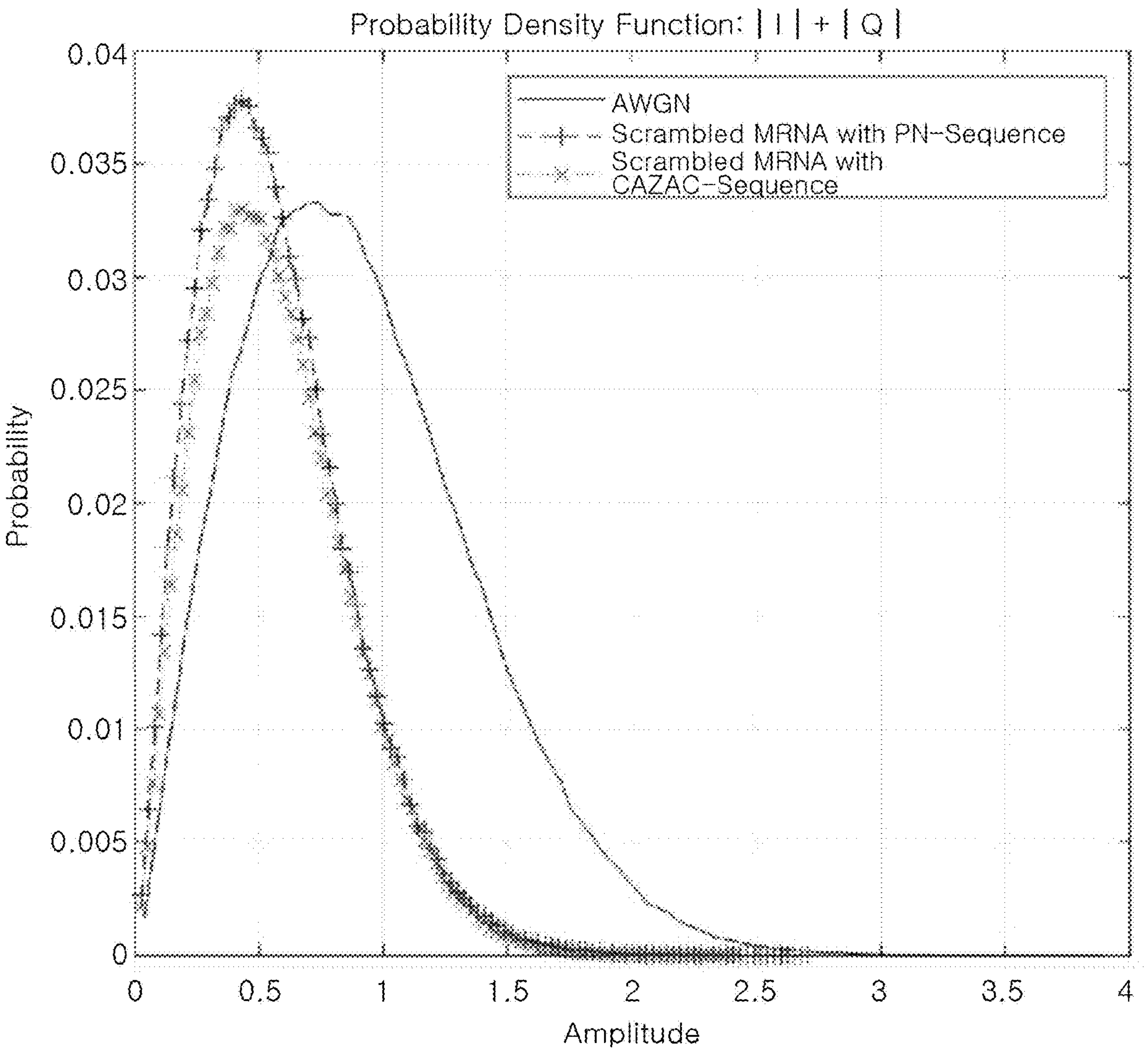
Figure 7D:
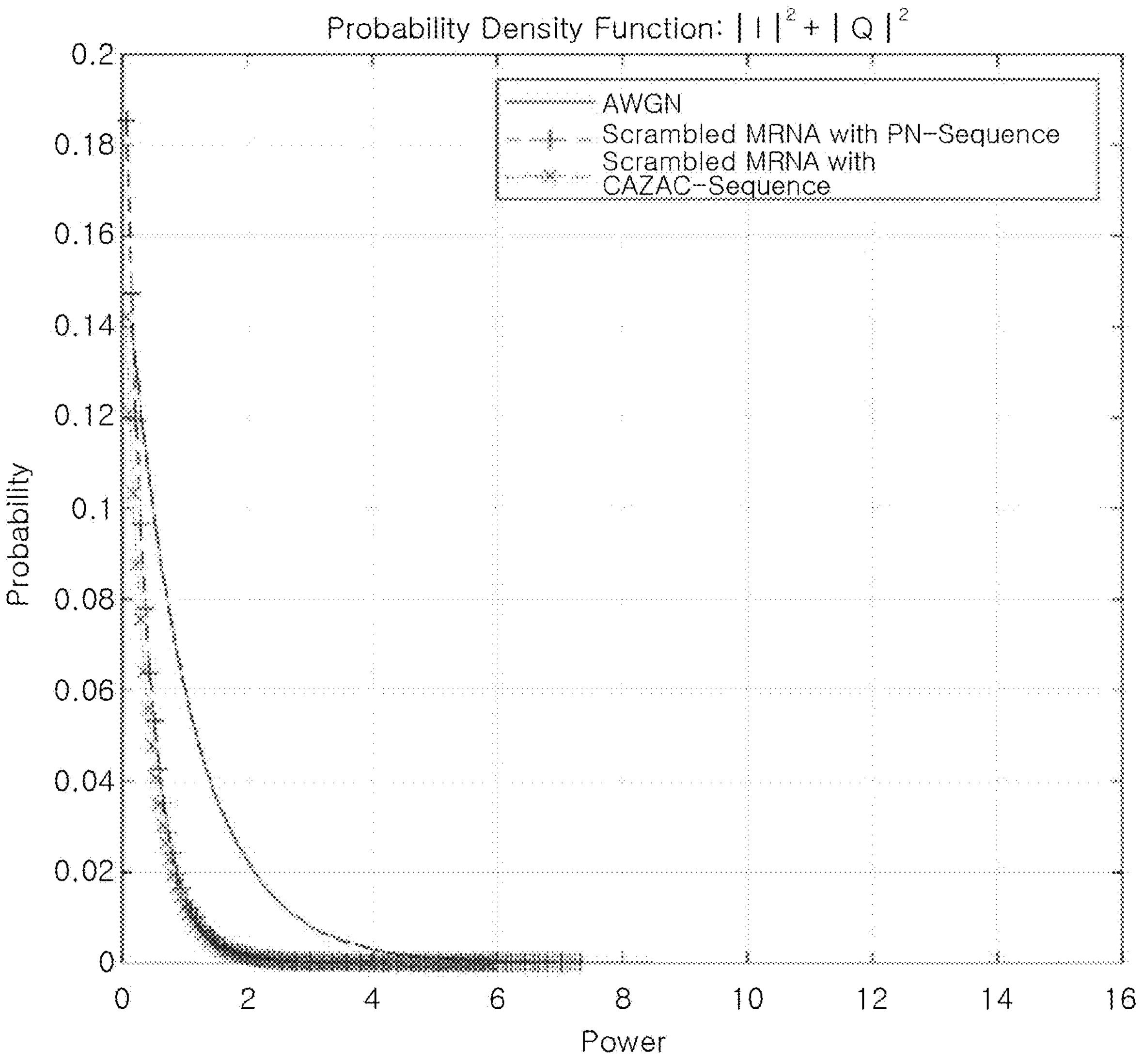

In addition, it may be seen that a noise signal output from the convolution operation unit 122 may have a characteristic of a Probability Density Function similar to an existing AWGN as shown in FIGS. 7A, 7B, 7C and 7D. FIG. 7A shows graphs of a Probability Density Function of In-Phase signal strength |I| of a random noise signal generated with a Complex Gaussian distribution, an expanded noise signal to which a Pseudo Noise Sequence is applied, and an expanded noise signal to which a CAZAC Sequence is applied. FIG. 7B shows graphs of a Probability Density Function of Quadrature signal strength |Q| of a random noise signal generated with a Complex Gaussian distribution, an expanded noise signal to which a Pseudo Noise Sequence is applied, and an expanded noise signal to which a CAZAC Sequence is applied. FIG. 7C shows graphs of a Probability Density Function of complex signal strength |I|+|Q|, which is a sum of an In-Phase component and a Quadrature component, of a random noise signal generated with a Complex Gaussian distribution, an expanded noise signal to which a Pseudo Noise Sequence is applied, an expanded noise signal to which a CAZAC Sequence is applied. FIG. 7D shows graphs of a Probability Density Function of complex signal power strength $|I|^2+|Q|^2$ of a random noise signal generated with a Complex Gaussian distribution, an expanded noise signal to which a Pseudo Noise Sequence is applied, an expanded noise signal to which a CAZAC Sequence is applied.

As described above, according to an embodiment of the present disclosure, noise signals of various bandwidths may be generated with low complexity so as to have characteristics similar to an AWGN by generating and then outputting narrowband noise signals of various bandwidths by performing randomization.

The combinations of each block of the block diagram and each step of the flowchart attached in this application may be performed by computer program instructions. Since the computer program instructions may be loaded in the processor of a general purpose computer, a special purpose computer, or other programmable data processing apparatus, the instructions, executed by the processor of the computer or other programmable data processing apparatus, create means for performing functions described in each block of the block diagram or each step of the flowchart. Since the computer program instructions, in order to implement functions in a specific manner, may be stored in a computer-readable storage medium or a computer-useable storage medium which may direct to other programmable data processing apparatus, the instructions stored in the computer-readable storage medium or the computer-useable storage medium may produce manufacturing items that include means for instructions to perform the functions described in each block of the block diagram or each step of the flowchart. Since the computer program instructions may be loaded in a computer or other programmable data processing apparatus, instructions, a series of sequences of which is executed in the computer or other programmable data processing apparatus to create processes executed by the computer to operate the computer or other programmable data processing apparatus, may provide operations for executing functions described in each block of the block diagram or each step of the flowchart.

In addition, each block or each step may refer to a part of modules, segments, or codes including at least one executable instruction for executing a specific logic function(s). Further, in some alternative embodiments, it is noted that the functions described in the blocks or steps may be run out of order. For example, two blocks or two steps that are consecutively illustrated may be executed simultaneously or in reverse order according to the particular function.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A noise signal generating apparatus comprising:

a bandwidth expansion unit configured to generate a noise signal having a second bandwidth by expanding a noise source signal having a first bandwidth to the second bandwidth that is greater than the first bandwidth; and a randomization unit configured to perform randomization and output the generated noise signal having the second bandwidth, wherein the bandwidth expansion unit includes:

a bandwidth expansion signal generating unit configured to generate a bandwidth expansion signal by determining the second bandwidth for expanding the first bandwidth of the noise source signal; and a logic operation unit configured to generate the noise signal having the second bandwidth through a logical conjunction operation on the noise source signal and the bandwidth expansion signal.

2. The apparatus of claim 1, wherein the bandwidth expansion signal generating unit is configured to generate the bandwidth expansion signal by using a product of a plurality of cosine functions.

3. The apparatus of claim 1, wherein the bandwidth expansion signal generating unit is configured to generate the bandwidth expansion signal based on the first bandwidth of the noise source signal.

4. The apparatus of claim 1, wherein the bandwidth expansion signal generating unit is configured to generate the bandwidth expansion signal by expanding the first bandwidth of the noise source signal by $2^K$ times by using K (K is natural number) number of cosine functions.

5. The apparatus of claim 4, wherein the bandwidth expansion signal generating unit is configured to generate the bandwidth expansion signal by using a bandwidth expansion level index $i_k$ that determines a bandwidth expansion level through activation or inactivation of the K number of cosine functions.

6. The apparatus of claim 1, wherein the randomization unit is configured to perform the randomization through a convolution operation using the noise signal having the second bandwidth and a pre-generated Pseudo Random Sequence.

7. The apparatus of claim 1, wherein the randomization unit is configured to perform the randomization through a convolution operation using the noise signal having the second bandwidth and a pre-generated constant amplitude zero auto-correlation (CAZAC) sequence.

8. The apparatus of claim 1, wherein the bandwidth expansion unit is configured to generate the noise source signal having the first bandwidth by passing a noise source signal through one or more narrowband filters.

9. A noise signal generating method performed by a noise signal generating apparatus, the method comprising:

generating a noise signal having a second bandwidth by expanding a noise source signal having a first bandwidth to the second bandwidth that is greater than the first bandwidth; and outputting the generated noise signal having the second bandwidth by performing randomization, wherein generating the noise signal having the second bandwidth includes;

generating a bandwidth expansion signal by determining the second bandwidth for expanding the first bandwidth of the noise source signal; and generating the noise signal having the second bandwidth through a logical conjunction operation on the noise source signal and the bandwidth expansion signal.

10. The method of claim 9, wherein generating the bandwidth expansion signal comprises generating the bandwidth expansion signal by using a product of a plurality of cosine functions.

11. The method of claim 9, wherein generating the bandwidth expansion signal comprises generating the bandwidth expansion signal based on the first bandwidth of the noise source signal.

12. The method of claim 9, wherein generating the bandwidth expansion signal comprises generating the bandwidth expansion signal by expanding the first bandwidth of the noise source signal by $2^K$ times by using K (K is natural number) number of cosine functions.

13. The method of claim 12, wherein generating the bandwidth expansion signal comprises generating the bandwidth expansion signal by using a bandwidth expansion level index $i_k$ that determines a bandwidth expansion level through activation or inactivation of the K number of cosine functions.

14. The method of claim 9, wherein outputting the noise signal by performing randomization includes:

generating a pseudo random sequence; and performing the randomization through a convolution operation using the noise signal having the second bandwidth and the generated Pseudo Random Sequence.

15. The method of claim 9, wherein outputting the noise signal by performing randomization includes:

generating a constant amplitude zero auto-correlation (CAZAC) sequence; and performing the randomization through a convolution operation using the noise signal having the second bandwidth and the generated constant amplitude zero auto-correlation (CAZAC) sequence.

16. The method of claim 9, further comprising:

generating the noise source signal having the first bandwidth by filtering a noise source signal through one or more narrowband filters.

17. A non-transitory computer-readable storage medium including computer programs, wherein the computer programs, when executed by a processor, cause the processor to perform a method comprising:

generating a noise signal having a second bandwidth by expanding a noise source signal having a first bandwidth to the second bandwidth that is greater than the first bandwidth; and outputting the generated noise signal having the second bandwidth by performing randomization, wherein generating the noise signal having the second bandwidth includes;

generating a bandwidth expansion signal by determining the second bandwidth for expanding the first bandwidth of the noise source signal; and generating the noise signal having the second bandwidth through a logical conjunction operation on the noise source signal and the bandwidth expansion signal.

* * * * *